US009760374B2

(12) United States Patent
Grisenthwaite

(10) Patent No.: US 9,760,374 B2
(45) Date of Patent: Sep. 12, 2017

(54) STACK POINTER AND MEMORY ACCESS ALIGNMENT CONTROL

(75) Inventor: Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 1633 days.

(21) Appl. No.: 13/067,805

(22) Filed: Jun. 28, 2011

(65) Prior Publication Data

US 2012/0042136 A1 Feb. 16, 2012

(30) Foreign Application Priority Data

Aug. 12, 2010 (GB) .................................. 1013528.3

(51) Int. Cl.
*G06F 15/00* (2006.01)
*G06F 9/30* (2006.01)
*G06F 9/40* (2006.01)
*G06F 9/38* (2006.01)

(52) U.S. Cl.
CPC ........ *G06F 9/30043* (2013.01); *G06F 9/3004* (2013.01); *G06F 9/30134* (2013.01); *G06F 9/3824* (2013.01)

(58) Field of Classification Search
None
See application file for complete search history.

(56) References Cited

U.S. PATENT DOCUMENTS

| 5,201,043 | A | 4/1993 | Crawford et al. |
| 5,596,717 | A | 1/1997 | Marshall, Jr. et al. |
| 5,666,508 | A * | 9/1997 | Marshall, Jr. ................. 711/201 |
| 5,761,491 | A * | 6/1998 | Circello et al. ............... 712/244 |
| 6,697,834 | B1 * | 2/2004 | Dice ............................. 718/102 |
| 2002/0087841 | A1 | 7/2002 | Faraboschi et al. |
| 2002/0129301 | A1 | 9/2002 | McKee et al. |
| 2007/0266374 | A1 * | 11/2007 | Grisenthwaite et al. ..... 717/127 |

FOREIGN PATENT DOCUMENTS

| CN | 1886727 | 12/2006 |
| JP | H64-91228 | 4/1989 |
| JP | H02-287741 | 11/1990 |
| JP | H08-328851 | 12/1996 |

(Continued)

OTHER PUBLICATIONS

International Search Report and Written Opinion of the International Searching Authority mailed Sep. 27, 2011 in PCT/GB2011/051090.

(Continued)

*Primary Examiner* — George Giroux
(74) *Attorney, Agent, or Firm* — Nixon & Vanderhye P.C.

(57) ABSTRACT

A data processing system 2 includes a stack pointer register 26, 28, 30, 32 storing a stack pointer value for use in stack access operations to a stack data store 44, 46, 48, 50. Stack alignment checking circuitry 36 which is selectively disabled may be provided to check memory address alignment of the stack pointer value associated with a stack memory access. The action of the stack alignment checking circuitry 36 is independent of any further other alignment checking performed in respect of all memory accesses. Thus, general alignment checking circuitry 38 may be provided and independently selectively disabled in respect of any memory access.

20 Claims, 4 Drawing Sheets

(56) References Cited

FOREIGN PATENT DOCUMENTS

| JP | 10-83305 | 3/1998 |
|----|----------|--------|
| JP | 2000-29690 | 1/2000 |
| JP | 2002-268915 | 9/2002 |
| TW | 386193 | 4/2000 |
| TW | I283828 | 7/2007 |

OTHER PUBLICATIONS

Great Britain Search Report for GB1013528.3 dated Nov. 18, 2010.
English translation of Taiwanese Office Action dated Jan. 6, 2015 in TW 100127445, 5 pages.
Chinese Office Action dated Sep. 10, 2014 in CN 201180038097.X, 12 pages.
Japanese Office Action dated Oct. 27, 2014 in JP 2013-523662 and English translation, 18 pages.
"Pentium Family Developer's Manual last volume" first edition, Intel Japan Corporation, accepted by JPO Information Center at H12/11/15, pp. 10-1 to 10-9 and 14-27 to 14-28.
"ARM Architecture Reference Manual ARM DDI 0100HJ-00" pp. A1-3, A1-4, A2-2, A2-6 to A2-10, A2-34 to A2-43, A4-190 to A4-193, B3-12 to B3-17, B5-13 to B5-15, ftp.at.netbsd.org, Mar. 2005.
Joseph Yui et al, "ARM Cortex-M3 System Development Guide" first edition, CQ Publishing, Ltd., Jun. 2009, pp. 26 to 28, 40 to 42, 99 to 101, 128 to 130, 149 to 151, 193 to 197, 336 to 337.
Chinese Second Office Action issued Apr. 3, 2015 in CN 201180038097.X and English translation, 26 pages.
Israeli Office Action issued Aug. 9, 2015 in IL 223731 and English translation, 3 pages.
Chinese Third Office Action issued Oct. 10, 2015 in CN 201180038097.X and English translation, 10 pages.

* cited by examiner

STACK POINTER AND MEMORY ACCESS ALIGNMENT CONTROL

BACKGROUND OF THE INVENTION

Field of the Invention

This invention relates to the field of data processing systems. More particularly, this invention relates to access alignment control of memory accesses performed within data processing systems.

Description of the Prior Art

It is known to provide data processing systems with mechanisms which check memory access alignment. Memory accesses may be unconstrained, such that any individual byte within the memory may be addressed by any sized memory access or they may be alignment constrained such that only memory accesses aligned with, for example, half-word, word, double-word etc boundaries within the memory may be made. Generally speaking, enforcement of memory access alignment requirements is helpful in the provision of high speed memory accesses, e.g. wide data buses may be used with these not having to accommodate accesses which are unaligned with the data bus width. However, a requirement for only aligned memory accesses is problematic when manipulating packed data structures in which the data elements being accessed may not themselves necessarily have boundaries which align with the alignment constraints imposed. In some situations instructions which are being executed may require alignment of the data accesses, such as some read-modify-write instructions to the stack data store. Furthermore, some application binary interfaces specify access alignment.

SUMMARY OF THE INVENTION

Viewed from one aspect the present invention provides an apparatus for processing data comprising:

processing circuitry responsive to program instructions to perform data processing operations;

a stack pointer register coupled to said processing circuitry and configured to store a stack pointer value indicative of an address within a memory of a stack data store;

stack alignment checking circuitry coupled to said processing circuitry and to said stack pointer register and configured to respond to a program instruction specifying a stack memory access to said stack data store at an address specified by said stack pointer value to detect if said stack pointer value matches a predetermined stack alignment condition;

alignment checking control circuitry coupled to said stack alignment checking circuitry and responsive to a stack configuration parameter to selectively disable said stack alignment checking circuitry independently of further alignment checking performed upon memory accesses.

The present technique recognises that alignment constraints which might be appropriate for stack memory accesses may be inappropriate for other memory accesses, e.g. memory accesses which do not involve the stack data store. As an example, a data structure not stored within a stack data store may be a packed data structure for which alignment constraints would be problematic whereas applying alignment constraints to the stack data store would assist in identifying corruption of the stack pointer or the stack data store. The present technique recognises this situation and provides the mechanism of stack alignment checking circuitry for checking the alignment of stack memory accesses with this being selectively disabled independently of any further alignment checking performed within the system, e.g. alignment checking performed upon all memory accesses both to the stack memory and not to the stack memory. Thus, stack alignment checking can either be performed or not be performed in combination with an independently controlled further checking of memory accesses. Thus, alignment may be enforced for the stack data store while alignment is not enforced for general memory accesses.

It will be appreciated that the further alignment checking could take a variety of different forms, such as alignment checking memory accesses not using the stack pointer. However, a useful arrangement is one in which the further alignment checking is alignment checking performed upon all memory accesses (i.e. memory accesses that both do and do not use the stack pointer).

It will be appreciated that a stack memory access may be either a read (pop) access or a write (push) access made to a top of stack address with a corresponding update to the stack pointer value being performed.

In addition to the stack alignment checking circuitry which is selectively disabled, some embodiments may additionally include general purpose alignment checking circuitry for detecting if any memory access meets predetermined alignment conditions. Thus, while it is possible to use the stack alignment checking circuitry alone, this stack alignment checking circuitry combines usefully with general purpose alignment checking circuitry. The general purpose alignment checking circuitry may also be controlled by the alignment checking control circuitry, such that it can be selectively disabled.

The alignment condition(s) imposed can vary. It may be that the predetermined stack alignment condition is unconstrained, which would be equivalent of disabling the stack alignment checking circuitry. However, the stack alignment checking circuitry is more useful when the alignment condition is such that the stack pointer value is an integer multiple of $2^N$, where N is a non-zero integer value (e.g. N is one of three or four corresponding to 64-bit and 128-bit alignment). The value of N, and accordingly the alignment condition, may be set under user control (such as software control).

While the present techniques may be used in embodiments containing a single stack pointer, the techniques are also applicable in embodiments containing a plurality of stack pointers, each storing a respective stack pointer value and subject to control with a respective stack configuration parameter determining whether or not stack alignment checking is disabled or enabled for the stack pointer concerned. These different stack pointers may be associated with difference exception levels (privilege levels) within the system.

Viewed from a further aspect the present invention provides an apparatus for processing data comprising:

processing means for performing data processing operations in response to program instructions;

stack pointer means for storing a stack pointer value, said stack pointer means being coupled to said processing means and said stack pointer value being indicative of an address within a memory of a stack data store;

stack alignment checking means for checking alignment, said stack alignment checking means being coupled to said processing means and to said stack pointer means and configured to respond to a program instruction specifying a memory access to said stack data store at an address specified by said stack pointer value to detect if said stack pointer value matches a predetermined stack alignment condition;

alignment checking control means for controlling alignment checking, said alignment checking control means being coupled to said stack alignment checking means and being responsive to a stack configuration parameter to selectively disable said stack alignment checking means independently of further alignment checking performed upon memory accesses.

Viewed from a further aspect the present invention provides a method of processing data comprising the steps of:

performing data processing operations in response to program instructions;

storing within a stack pointer register a stack pointer value indicative of an address within a memory of a stack data store;

in response to a program instruction specifying a memory access to said stack data store at an address specified by said stack pointer value, detecting if said stack pointer value matches a predetermined stack alignment condition;

in response to a stack configuration parameter, selectively omitting said detecting step independently of alignment checking performed upon memory accesses not using said stack pointer value.

Embodiments of the invention may also be provided in the form of a virtual machine formed of a general purpose computer executing appropriate software to provide an execution environment matching the apparatus and methods described above.

The above; and other objects, features and advantages of this invention will be apparent from the following detailed description of illustrative embodiments which is to be read in connection with the accompanying drawings.

DESCRIPTION OF THE EMBODIMENTS

Figure 1:
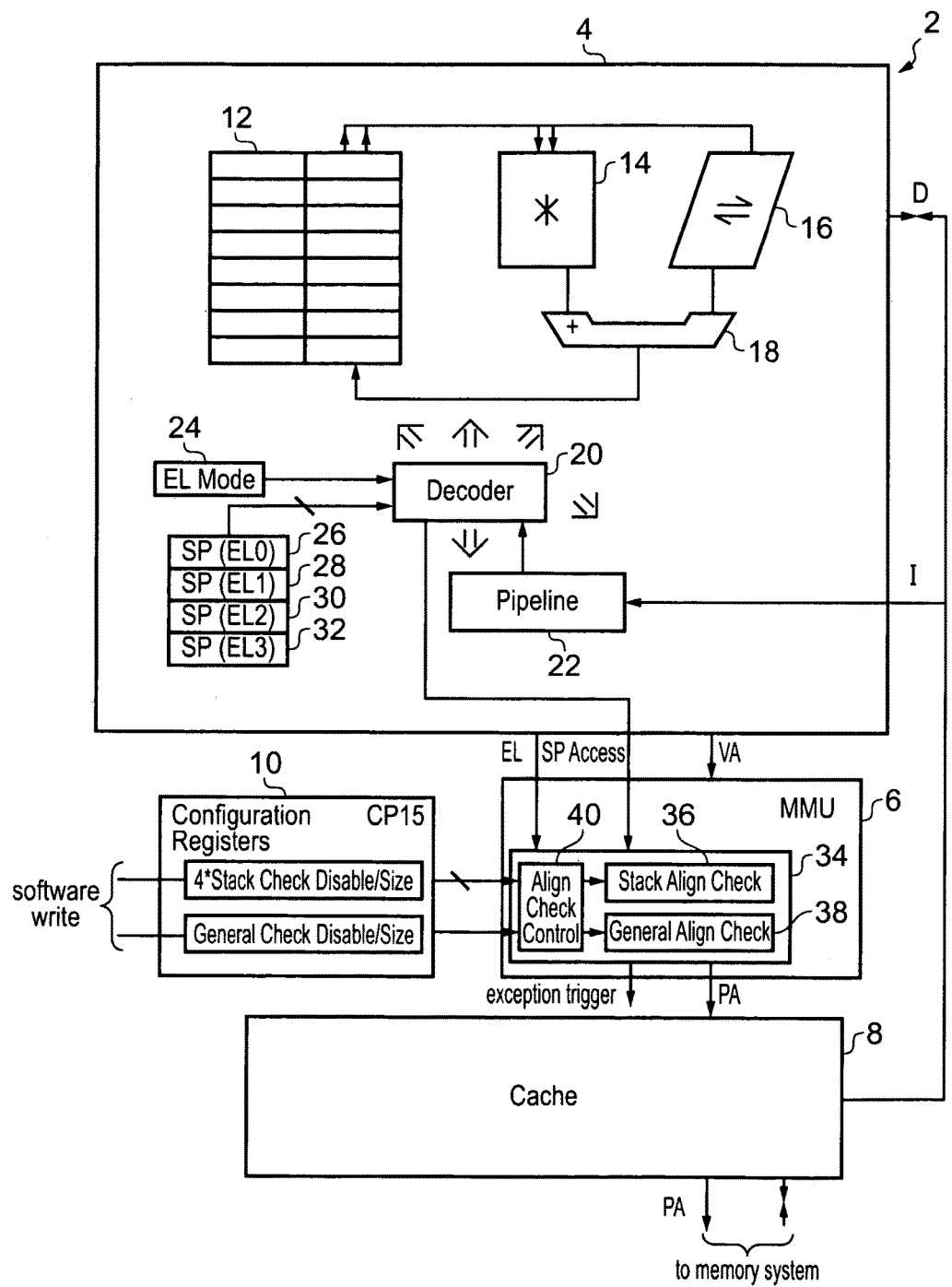
FIG. 1 schematically illustrates a data processing apparatus incorporating alignment checking circuitry and alignment control circuitry.

FIG. 1 schematically illustrates a data processing apparatus 2 comprising a processor core 4 coupled via a memory management unit 6 to a cache memory 8. A main memory is coupled to the cache memory 8, although the main memory it is not illustrated in FIG. 1. A configuration data store 10 stores configuration data writeable under software control for controlling various configuration parameters for the data processing apparatus 2. This configuration data store may be provided in the form of a coprocessor (e.g. CP15) to which writes may be made to set configuration parameters and reads made to read configuration parameters.

The processor core 4 includes a data path formed of a general purpose register bank 12, a multiplier 14, a shifter 16 and an adder 18. The data path 12, 14, 16, 18 is controlled by control signals generated by decoder circuitry 20 which decodes program instructions received from an instruction pipeline 22 and generates control signals for configuring the data path 12, 14, 16, 18 to perform the required data processing operations as well as configuring and controlling other portions of the processor core 4 to perform the functions necessary for the processing instruction concerned. It will be appreciated that the processor core 4 will typically include many further circuit elements, but that these have been omitted from FIG. 1 for clarity.

The processor core 4 can operate in a plurality of exception level. Each of these exception levels corresponds to an exception level mode value and a mode register 24 stores a value indicating the current exception level mode of the processor core 4. Each of the exception level modes has an associated stack pointer register 26, 28, 30, 32 storing a respective stack pointer value to be used for stack memory accesses instructed by stack access instructions when operating in a particular exception level mode. Thus, a stack push or stack pop instruction executed when the processor core 4 is in exception level 2 (EL2) will use the stack pointer value stored within stack pointer register 30.

The processor core 4 consumes data and instructions read from the memory via the cache memory 8. If an item of data or an instruction is not present within the cache memory 8, then an access to main memory is made to fetch that data item or instruction. Many possible cache and memory architectures are possible and FIG. 1 illustrates only one example of such a cache or memory architecture.

The processor core 4 generates a virtual address which is translated to a physical address by a memory management unit 6. The memory management unit 6 typically uses page table data to perform this address translation. The memory management unit 6 also stores access permission data for determining whether or not a particular memory access should be permitted. The memory management unit includes alignment checking circuitry 34 which includes stack alignment checking circuitry 36 and general alignment checking circuitry 38. The stack alignment checking circuitry 36 is responsible for checking alignment of stack memory accesses, such as stack push instructions or stack pop instructions. The general alignment checking circuitry 38 is responsible for checking all memory accesses such as general purpose load or store instructions. The alignment checking circuitry 34 includes alignment checking control circuitry 40 which selectively enables or disables independently of each other the stack alignment checking circuitry 36 and the general alignment checking circuitry 38. Thus, the stack alignment checking circuitry 36 can be either disabled or enabled and independently the general alignment checking circuitry 38 may be either disabled or enabled. The stack alignment checking circuitry 36 and the general alignment checking circuitry 38 can thus in combination perform no check, a check upon only access to the stack data store or a check upon all memory accesses.

The alignment checking control circuitry 40 is responsive to configuration parameters stored within the configuration data store 10. For each of the stack pointer registers 26, 28, 30, 32 there is stored a stack configuration parameter which indicates whether or not alignment checking is disabled in respect of stack accesses occurring at the corresponding exception level for the stack pointer register 26, 28, 30, 32 concerned. Thus, stack alignment checking may be performed for the stack pointer values corresponding to exception levels EL0 and EL2 whereas stack alignment checking may be disabled for exception levels EL1 and EL3. The configuration data store 10 also includes in respect of each alignment check performed, data indicating the alignment size against which a match is checked, e.g. whether alignment is being checked against 64-bit memory address boundaries or 128 memory address boundaries corresponding to memory addresses that are a multiple of $2^3$ or $2^4$.

The configuration data store 10 further includes a general configuration parameter controlling whether or not the general alignment checking circuitry 38 is disabled or enabled. The size of the alignment enforced for such general alignment checking is also specified as a configuration parameter. The confirmation parameter stored within the configuration data store 10 may be written under software control. It is also possible that these configuration parameters may be set under hardware control or pre-programmed in hardware.

Figure 2:
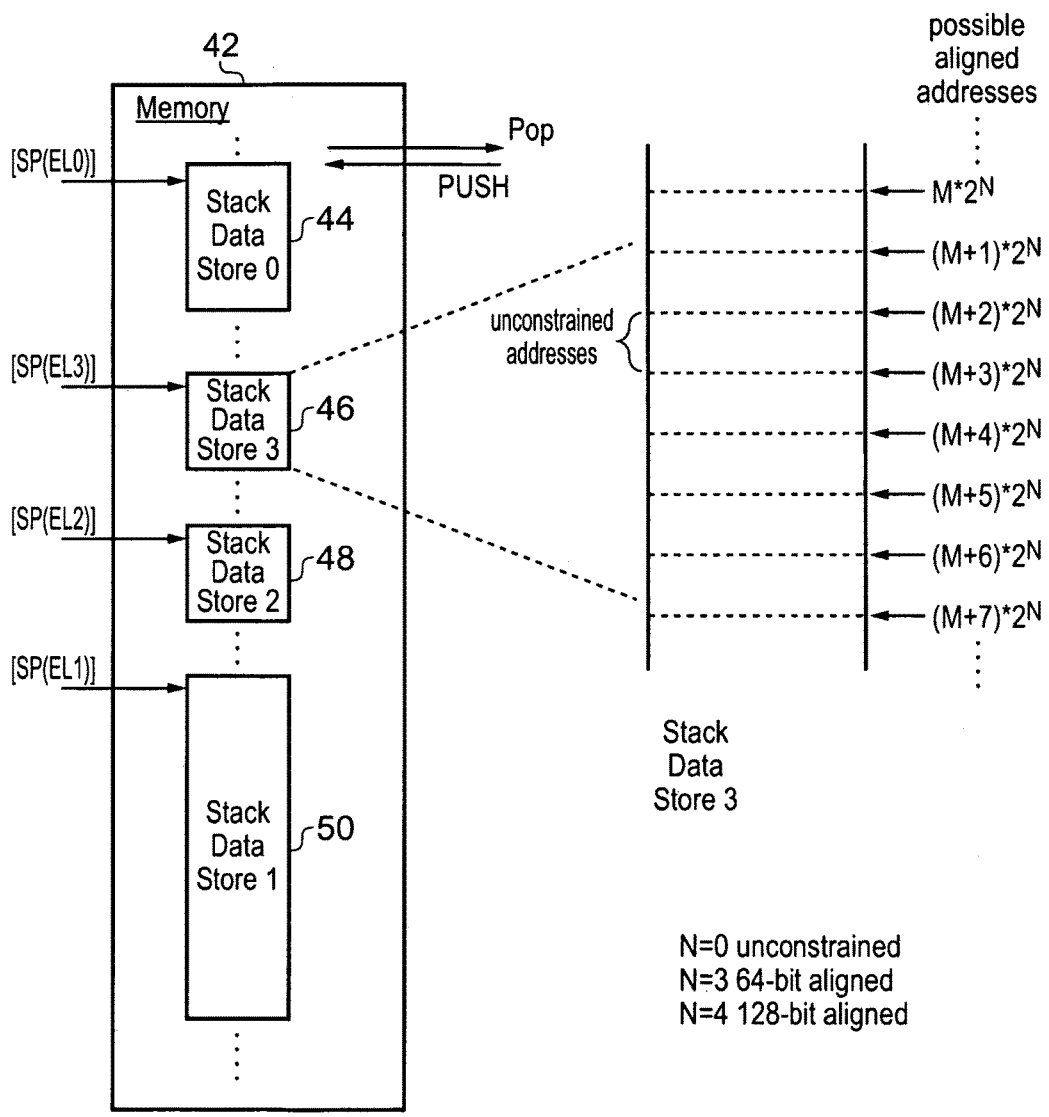
FIG. 2 schematically illustrates a memory including multiple stack data stores subject to selectively disabled alignment control.

FIG. 2 schematically illustrates a memory 42 including four stack data stores 44, 46, 48, 50 corresponding to different exception levels. The stack pointer values stored in the stack pointer registers 26, 28, 30, 32 indicate the top address values for each of these stack data stores 44, 46, 48, 50 to which stack memory accesses, such as push operations or pop operations, are performed.

As an example, the alignment condition associated with the stack data store 46 is illustrated in FIG. 2. If alignment is being enforced, then only addresses which are an integer multiple of $2^N$ are valid stack pointer values. If the stack pointer value is found to differ from these allowed values, then an exception is triggered. The consequences of the triggering of such an exception can vary depending upon the implementation. Such an exception could trigger a software response (running exception handling code) or a hardware response (an enforced reset) depending upon the nature of the system concerned.

In the example illustrated, the values of N may be 3 or 4 corresponding respectively to 64-bit alignment being enforced as the stack alignment condition or 128-bit alignment being enforced as the stack alignment condition. Also illustrated in FIG. 2 is that if the stack alignment checking circuitry 38 is disabled, then any address may be used as the stack pointer value and the top address of the stack data store 46 can be at any position within the memory address space (subject to any alignment constraint separately enforced by the general alignment checking circuitry 38 upon all memory accesses).

Figure 3:
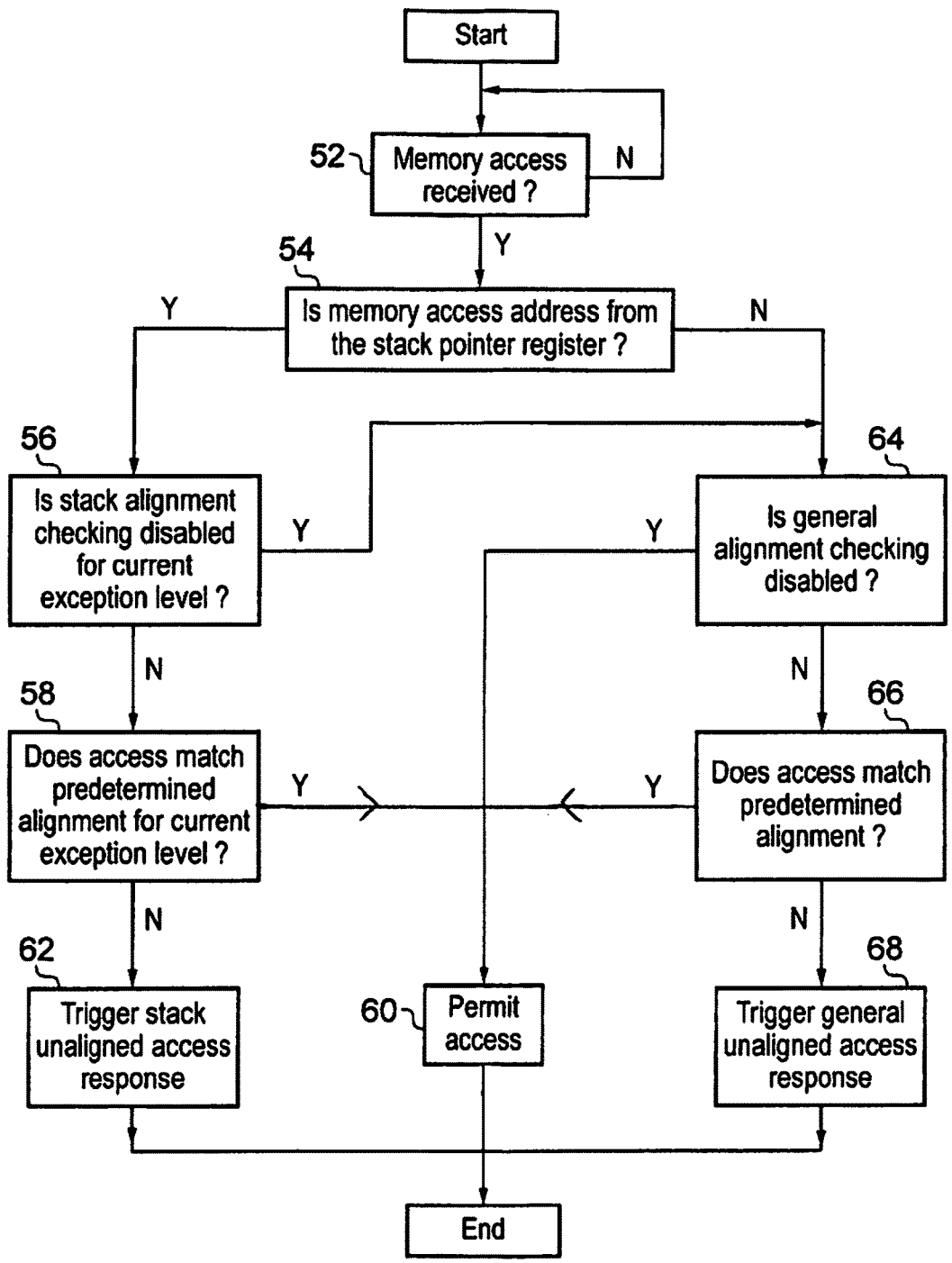
FIG. 3 is a flow diagram schematically illustrating a method of alignment control for stack memory accesses and general purpose accesses.

FIG. 3 is a flow diagram schematically illustrating the operation of the alignment checking circuitry 34. At step 52 processing waits until a memory access is received. Step 54 determines whether the memory access address comes from the stack pointer register. If the memory access is a stack memory access, i.e. with the address coming from the stack pointer register, then processing proceeds to step 56 where it is determined whether or not stack alignment checking is disabled for the current exception level at which the processor core 4 is executing (as may be determined using the exception level mode register 24). If stack alignment checking is enabled, then step 58 determines whether or not the access concerned matches the predetermined alignment condition for the current exception level. If the predetermined alignment condition is met (i.e. the access is properly aligned), then processing proceeds to step 60 where the access is permitted. If the access does not match the predetermined alignment condition (i.e. the access is misaligned), then processing proceeds to step 62 where a stack unaligned access response is triggered. If the determination at step 56 is that stack alignment checking is disabled, the processing proceeds to step 64 where a determination is made as to whether general alignment checking is disabled.

If the determination at step 54 is that the memory access is not a stack memory access (i.e. does not involve use of an address read from the stack pointer register), then processing proceeds to step 64 where a determination is made as to whether or not general alignment checking is currently disabled. If general alignment checking is currently disabled, then processing proceeds to step 60 where the access is permitted. If the determination at step 64 is that general alignment checking is not disabled, then processing proceeds to step 66 where a determination is made as to whether or not the access matches the predetermined alignment condition for general accesses (i.e. the general purpose alignment condition). If the access does match this general purpose alignment condition (i.e. is aligned), then processing proceeds to step 60 where the access is permitted. If the access does not match the general purpose alignment condition (i.e. is misaligned), then processing proceeds to step 68 where a general unaligned access response is triggered.

Figure 4:
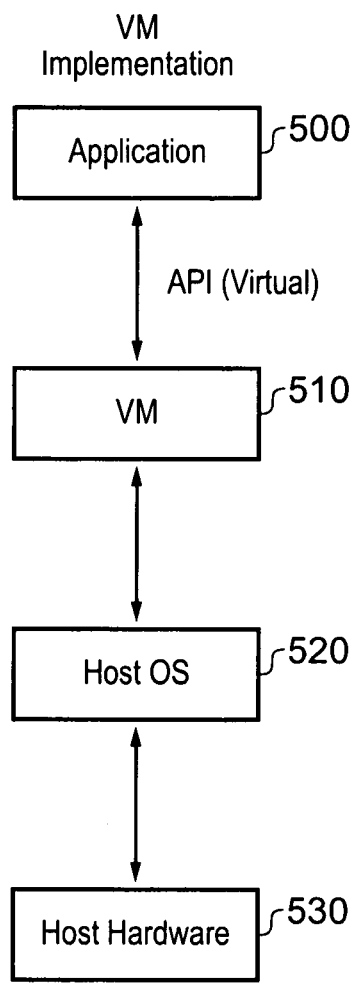
FIG. 4 is a diagram schematically illustrating a virtual machine implementation of the above described techniques.

FIG. 4 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   processing circuitry responsive to program instructions to perform data processing operations;
   a stack pointer register coupled to said processing circuitry and configured to store a stack pointer value indicative of an address within a memory of a stack data store;
   stack alignment checking circuitry coupled to said processing circuitry and to said stack pointer register and configured to respond to a program instruction specifying a memory access to said stack data store at an address specified by said stack pointer value to detect if said stack pointer value matches a predetermined stack alignment condition;
   alignment checking control circuitry coupled to said stack alignment checking circuitry and responsive to a stack configuration parameter to selectively disable said stack alignment checking circuitry independently of further alignment checking performed upon memory accesses.

2. Apparatus as claimed in claim 1, wherein said further alignment checking comprises alignment checking for all memory accesses.

3. Apparatus as claimed in claim 1, wherein said stack memory access is one of:
  (i) a stack push operation storing one or more data values to said stack memory starting at a top of stack address specified by said stack pointer value and updating said stack pointer value to indicate a new top of stack address; and
  (ii) a stack pop operation reading one or more data values from said stack memory starting at a top of stack address specified by said stack pointer value and updating said stack pointer value to indicate a new top of stack address.

4. Apparatus as claimed in claim 2, comprising general purpose alignment checking circuitry coupled to said processing circuitry and configured to respond to a program instruction specifying a general purpose access to said memory at any memory address to detect if said address matches a predetermined general purpose alignment condition.

5. Apparatus as claimed in claim 4, wherein said alignment checking control circuitry is coupled to said general purpose alignment checking circuitry and is responsive to a general configuration parameter to selectively disable said general purpose alignment checking circuitry independently of alignment checking performed by said stack alignment checking circuitry upon stack memory accesses using said stack pointer value.

6. Apparatus as claimed in claim 1, wherein said predetermined stack alignment condition comprises said stack pointer value is one of:
  unconstrained;
  an integer multiple of $2^N$, where N is a non-zero integer value.

7. Apparatus as claimed in claim 6, wherein N is one of 3 and 4.

8. Apparatus as claimed in claim 4, wherein N is set under user control.

9. Apparatus as claimed in claim 1, comprising a plurality stack pointer registers each storing a respective stack pointer value and wherein said processing circuitry is configured to operate at a plurality exception levels each associated with a respective one of said plurality of stack pointer registers for use when said processing circuitry is operating at said exception level and having a respective stack configuration parameter for controlling whether or not stack alignment checking circuitry is disabled at that exception level.

10. Apparatus for processing data comprising:
  processing means for performing data processing operations in response to program instructions;
  stack pointer means for storing a stack pointer value, said stack pointer means being coupled to said processing means and said stack pointer value being indicative of an address within a memory of a stack data store;
  stack alignment checking means for checking alignment, said stack alignment checking means being coupled to said processing means and to said stack pointer means and configured to respond to a program instruction specifying a memory access to said stack data store at an address specified by said stack pointer value to detect if said stack pointer value matches a predetermined stack alignment condition;
  alignment checking control means for controlling alignment checking, said alignment checking control means being coupled to said stack alignment checking means and being responsive to a stack configuration parameter to selectively disable said stack alignment checking means independently of further alignment checking performed upon memory accesses.

11. A method of processing data comprising the steps of:
  performing data processing operations in response to program instructions;
  storing within a stack pointer register a stack pointer value indicative of an address within a memory of a stack data store;
  in response to a program instruction specifying a memory access to said stack data store at an address specified by said stack pointer value, detecting if said stack pointer value matches a predetermined stack alignment condition;
  in response to a stack configuration parameter, selectively omitting said detecting step independently of further alignment checking performed upon memory accesses.

12. A method as claimed in claim 11, wherein said further alignment checking comprises alignment checking for all memory accesses.

13. A method as claimed in claim 11, wherein said stack memory access is one of:
  (i) a stack push operation storing one or more data values to said stack memory starting at a top of stack address specified by said stack pointer value and updating said stack pointer value to indicate a new top of stack address; and
  (ii) a stack pop operation reading one or more data values from said stack memory starting at a top of stack address specified by said stack pointer value and updating said stack pointer value to indicate a new top of stack address.

14. A method as claimed in claim 11, comprising the steps of general purpose alignment checking circuitry responsive to a program instruction specifying a general purpose access to said memory at any memory address to detect if said address matches a predetermined general purpose alignment condition.

15. A method as claimed in claim 14, wherein in response to a general configuration parameter selectively disabling said general purpose alignment checking independently of alignment checking performed upon stack memory accesses using said stack pointer value.

16. A method as claimed in claim 11, wherein said predetermined stack alignment condition comprises said stack pointer value is one of:
  unconstrained;
  an integer multiple of $2^N$, where N is a non-zero integer value.

17. A method as claimed in claim 16, wherein N is one of 3 and 4.

18. A method as claimed in claim 16, wherein N is set under user control.

19. A method as claimed in claim 11, comprising the steps of storing a plurality of stack pointer value in respective stack pointer registers and operating at a plurality exception levels each associated with a respective one of said plurality of stack pointer registers for use when said processing circuitry is operating at said exception level and having a respective stack configuration parameter for controlling whether or not stack alignment checking is performed at that exception level.

20. A virtual machine comprising a computer program stored on a non-transitory, computer-readable medium to control a computer to perform a method as claimed in claim 11.

* * * * *